US009864899B2

(12) United States Patent
Matsuhashi

(10) Patent No.: US 9,864,899 B2
(45) Date of Patent: Jan. 9, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenichi Matsuhashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/233,459

(22) Filed: Aug. 10, 2016

(65) Prior Publication Data

US 2017/0053183 A1   Feb. 23, 2017

(30) Foreign Application Priority Data

Aug. 20, 2015 (JP) ................ 2015-163090

(51) Int. Cl.
*G06K 9/46* (2006.01)
*G06T 7/00* (2017.01)
*G06K 9/00* (2006.01)
*G06T 7/73* (2017.01)

(52) U.S. Cl.
CPC ..... *G06K 9/00201* (2013.01); *G06K 9/00993* (2013.01); *G06T 7/73* (2017.01); *G06K 2209/27* (2013.01); *G06K 2209/40* (2013.01); *G06T 2207/10004* (2013.01)

(58) Field of Classification Search
CPC ... G06K 9/00201; G06K 9/00993; G06T 7/73
See application file for complete search history.

(56) References Cited

U.S. PATENT DOCUMENTS

| 9,355,334 | B1* | 5/2016 | Martinson | G06K 9/00369 |
| 2003/0169906 | A1* | 9/2003 | Gokturk | G06K 9/00201 382/115 |
| 2006/0291697 | A1* | 12/2006 | Luo | G06K 9/00369 382/104 |
| 2009/0116732 | A1* | 5/2009 | Zhou | H04N 13/026 382/154 |

(Continued)

FOREIGN PATENT DOCUMENTS

| JP | 2005-196542 A | 7/2005 |
| JP | 2015-073185 A | 4/2015 |

*Primary Examiner* — David F Dunphy
(74) *Attorney, Agent, or Firm* — Fitzpatrick, Cella, Harper & Scinto

(57) ABSTRACT

There is provided an image processing apparatus. An image data acquisition unit acquires a plurality of image data items each containing one or more objects. A position acquisition unit acquires respective positions, in a depth direction, of a plurality of objects contained in the plurality of image data items. An object recognition unit performs, with respect to each of the plurality of objects, object recognition processing of detecting a corresponding object candidate from among a plurality of object candidates. The object recognition unit performs the object recognition processing, based on the respective positions of the plurality of objects in the depth direction, in such a manner that the closer to a front side an object is located, the more preferentially the object recognition processing of that object is performed.

13 Claims, 12 Drawing Sheets

(56) References Cited

U.S. PATENT DOCUMENTS

2012/0154373 A1* 6/2012 Finocchio .............. G06N 5/046
  345/419
2016/0050173 A1* 2/2016 Nakamura ........... G06Q 10/107
  709/206
2016/0247290 A1* 8/2016 Liu ...................... G06K 9/4604

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Technology for searching for (extracting) a desired image data item from among image data items that have been input is currently known (Japanese Patent Laid-Open No. 2005-196542). An image search apparatus disclosed in Japanese Patent Laid-Open No. 2005-196542 performs pattern matching processing for each predetermined range of input image data items and, based on the processing result, extracts a specific image data item related to a face image in those image data items.

The computational load of processing for recognizing an object (a person or the like) contained in an image data item (processing for specifying who or what each object is) is relatively high. Thus, in the case where, for example, a user attempts to search for an image data item containing a desired object from among a large number of image data items, there is a possibility that it may take a long time to obtain a search result.

Incidentally, for the user, the importance of objects contained in image data items is not necessarily uniform. For example, when a plurality of image data items are present, the importance of an object contained in a certain image data item may be higher than the importance of that object contained in another image data item. Also, even when only one image data item is present, the importance may vary among a plurality of objects contained in this image data item. However, with conventional technology, object recognition processing is performed without taking the importance of objects into account.

SUMMARY OF THE INVENTION

The present invention has been made in consideration of the above situation and provides a technology for preferentially performing, during object recognition processing, recognition processing of an object that is considered to be of high importance to the user.

According to a first aspect of the present invention, there is provided an image processing apparatus comprising: an image data acquisition unit configured to acquire a plurality of image data items each containing one or more objects; a position acquisition unit configured to acquire respective positions, in a depth direction, of a plurality of objects contained in the plurality of image data items; and an object recognition unit configured to perform, with respect to each of the plurality of objects, object recognition processing of detecting a corresponding object candidate from among a plurality of object candidates, wherein the object recognition unit performs the object recognition processing, based on the respective positions of the plurality of objects in the depth direction, in such a manner that the closer to a front side an object is located, the more preferentially the object recognition processing of that object is performed.

According to a second aspect of the present invention, there is provided an image processing apparatus comprising: an image data acquisition unit configured to acquire an image data item containing a plurality of objects; a position acquisition unit configured to acquire respective positions, in a depth direction, of the plurality of objects; and an object recognition unit configured to perform, with respect to each of the plurality of objects, object recognition processing of detecting a corresponding object candidate from among a plurality of object candidates, wherein the object recognition unit performs the object recognition processing, based on the respective positions of the plurality of objects in the depth direction, in such a manner that the closer to a front side an object is located, the more preferentially the object recognition processing of that object is performed.

According to a third aspect of the present invention, there is provided an image processing method by an image processing apparatus, comprising: acquiring a plurality of image data items each containing one or more objects; acquiring respective positions, in a depth direction, of a plurality of objects contained in the plurality of image data items; and performing, with respect to each of the plurality of objects, object recognition processing of detecting a corresponding object candidate from among a plurality of object candidates, wherein the performing performs the object recognition processing, based on the respective positions of the plurality of objects in the depth direction, in such a manner that the closer to a front side an object is located, the more preferentially the object recognition processing of that object is performed.

According to a fourth aspect of the present invention, there is provided an image processing method by an image processing apparatus, comprising: acquiring an image data item containing a plurality of objects; acquiring respective positions, in a depth direction, of the plurality of objects; and performing, with respect to each of the plurality of objects, object recognition processing of detecting a corresponding object candidate from among a plurality of object candidates, wherein the performing performs the object recognition processing, based on the respective positions of the plurality of objects in the depth direction, in such a manner that the closer to a front side an object is located, the more preferentially the object recognition processing of that object is performed.

According to a fifth aspect of the present invention, there is provided a non-transitory computer-readable storage medium which stores a program for causing a computer to execute an image processing method comprising: acquiring a plurality of image data items each containing one or more objects; acquiring respective positions, in a depth direction, of a plurality of objects contained in the plurality of image data items; and performing, with respect to each of the plurality of objects, object recognition processing of detecting a corresponding object candidate from among a plurality of object candidates, wherein the performing performs the object recognition processing, based on the respective positions of the plurality of objects in the depth direction, in such a manner that the closer to a front side an object is located, the more preferentially the object recognition processing of that object is performed.

According to a sixth aspect of the present invention, there is provided a non-transitory computer-readable storage medium which stores a program for causing a computer to execute an image processing method comprising: acquiring an image data item containing a plurality of objects; acquiring respective positions, in a depth direction, of the plurality of objects; and performing, with respect to each of the plurality of objects, object recognition processing of detecting a corresponding object candidate from among a plurality of object candidates, wherein the performing performs the object recognition processing, based on the respective positions of the plurality of objects in the depth direction, in such a manner that the closer to a front side an object is located, the more preferentially the object recognition processing of that object is performed.

Further features of the present invention will become apparent from the following description of exemplary embodiments with reference to the attached drawings.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

Figure 1:
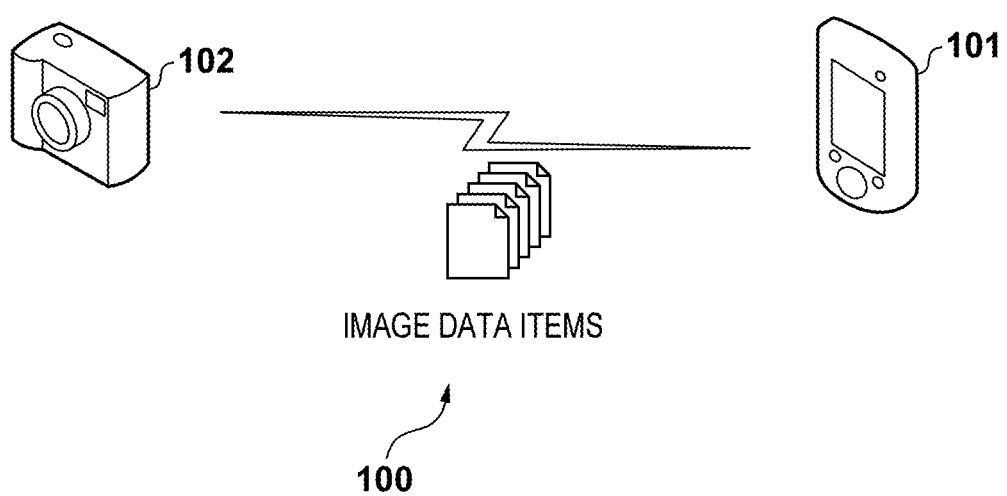
FIG. 1 is a diagram showing a configuration of an image processing system 100.

FIG. 1 is a diagram showing a configuration of an image processing system 100 according to a first embodiment. The image processing system 100 includes an image processing apparatus 101 and an image capturing apparatus 102. The image processing apparatus 101 is implemented by an information processing apparatus such as a smartphone or a personal computer (PC), for example. The image processing apparatus 101 receives image data items captured by the image capturing apparatus 102 and searches for an image data item containing an object desired by a user. Communication between the image processing apparatus 101 and the image capturing apparatus 102 may be performed through a cable or wirelessly.

Figure 2:
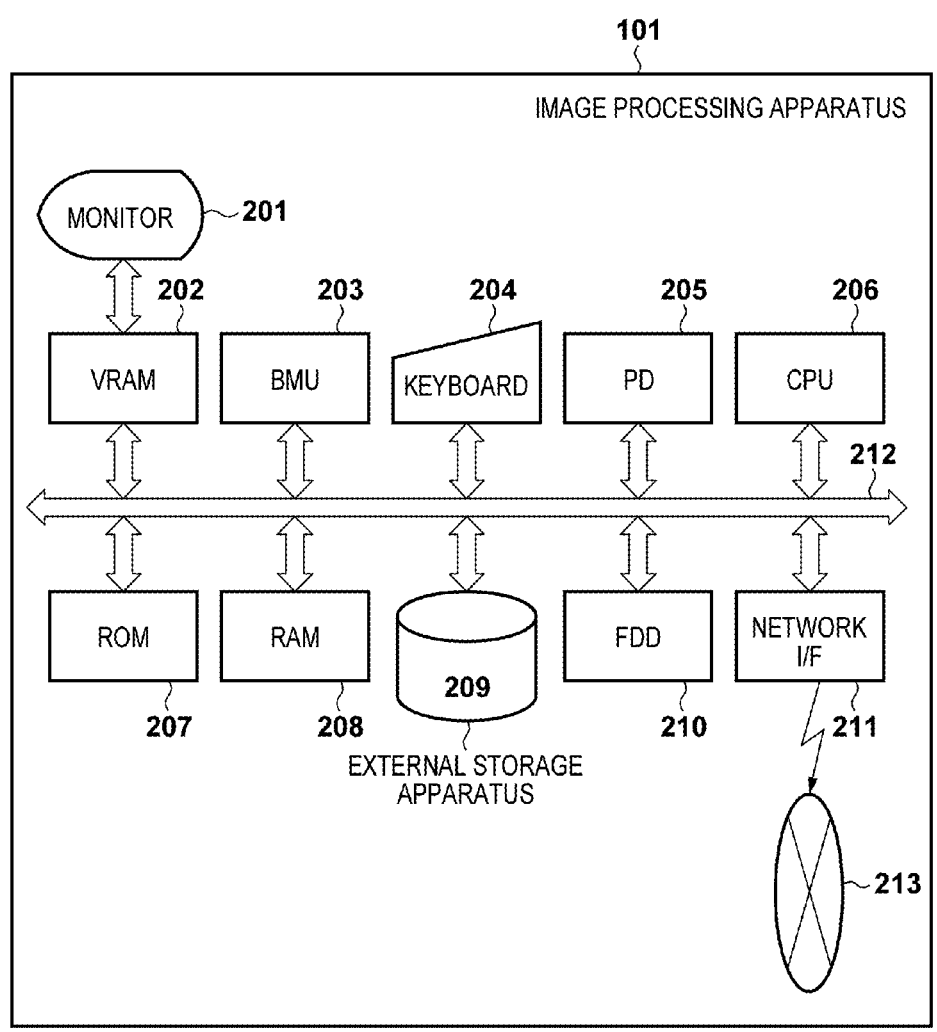
FIG. 2 is a block diagram showing a configuration of an image processing apparatus 101.

FIG. 2 is a block diagram showing a configuration of the image processing apparatus 101. Note that the configuration shown in FIG. 2 may be changed as appropriate in accordance with the type (smartphone, PC, etc.) and the like of the information processing apparatus implementing the image processing apparatus 101. For example, although the image processing apparatus 101 shown in FIG. 2 includes an FDD 210, when the image processing apparatus 101 is implemented by a smartphone such as that shown in FIG. 1, the image processing apparatus 101 generally does not include the FDD 210.

The image processing apparatus 101 has a monitor 201, a VRAM 202, a BMU 203, a keyboard 204, a PD 205, a CPU 206, a ROM 207, a RAM 208, an external storage apparatus 209, the FDD 210, and a network I/F 211. The monitor 201 displays data held by the image processing apparatus 101 and data supplied from the outside, for example. In the VRAM 202, an image to be displayed on the monitor 201 is rendered. An image data item generated in this VRAM 202 is transferred to the monitor 201 in accordance with a predetermined rule, and thus an image is displayed on the monitor 201. The BMU 203 (bit move unit) controls data transfer between memories (e.g., between the VRAM 202 and another memory) and data transfer between a memory and each I/O device (e.g., network I/F 211), for example. The keyboard 204 has various keys for inputting characters and the like. The PD 205 (pointing device) is used to designate icons, menus, and other content that is displayed on the monitor 201, for example. The CPU 206 controls devices based on a control program stored in the ROM 207, the external storage apparatus 209, or the FDD 210. The ROM 207 stores various control programs and data. The RAM 208 has a work area for the CPU 206, an area where data is saved during error processing, an area into which a control program is loaded, and the like. The external storage apparatus 209 stores control programs that are to be executed in the image processing apparatus 101 and data. The FDD 210 controls access to a flexible disk represented by a floppy disk (registered trademark) or the like. The network I/F 211 is an interface for connecting to a network line 213 such as the Internet. A CPU bus 212 includes an address bus, a data bus, and a control bus. The control programs can be provided to the CPU 206 from the ROM 207, the external storage apparatus 209, or the FDD 210, or alternatively can be provided from other information processing apparatuses and the like over a network via the network I/F 211.

Figure 3:
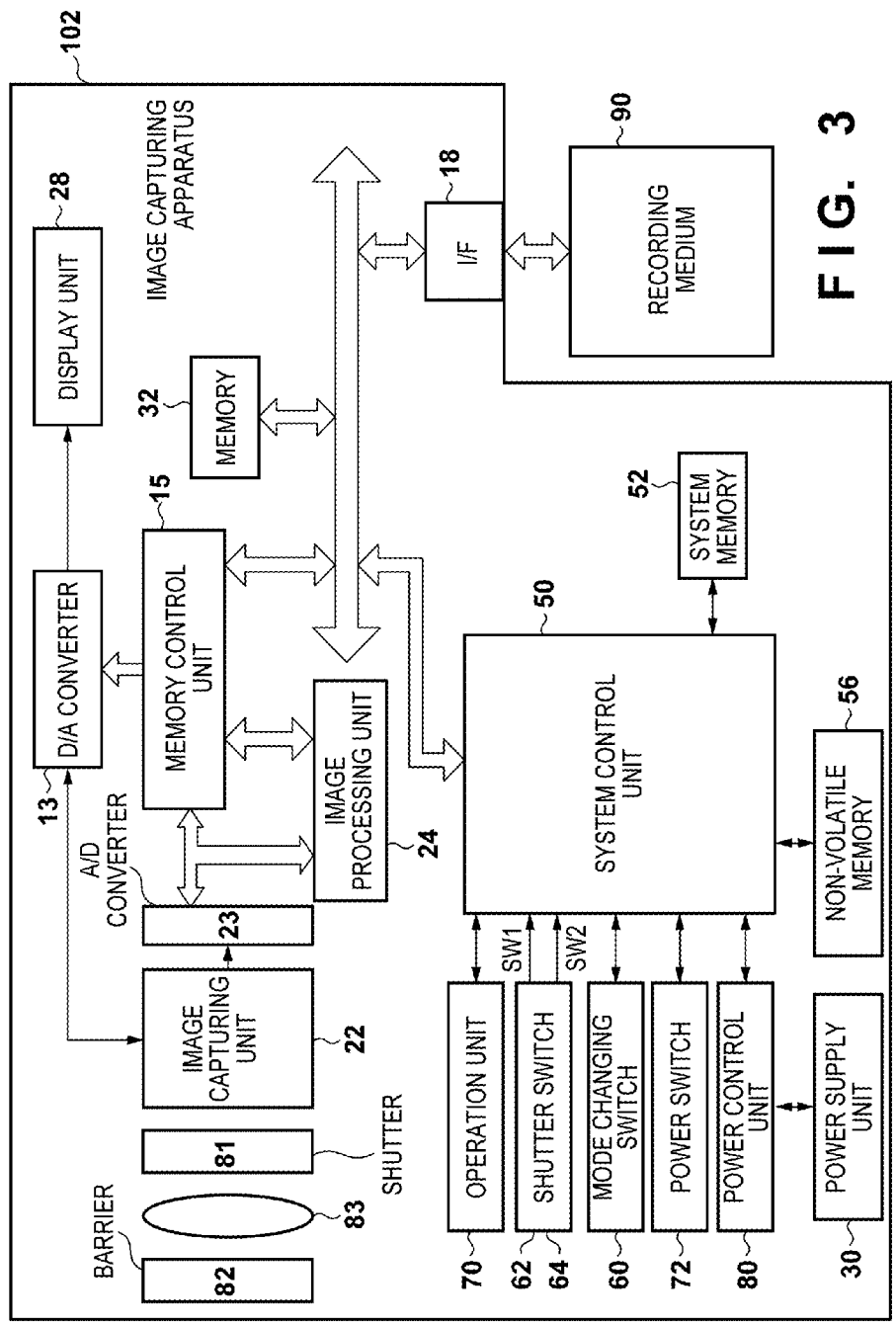
FIG. 3 is a block diagram showing a configuration of an image capturing apparatus 102.

FIG. 3 is a block diagram showing a configuration of the image capturing apparatus 102 according to the first embodiment. FIG. 3 shows a shooting lens 83 including a focusing lens, a shutter 81 with an aperture function, and an image capturing unit 22 configured by a CCD, a CMOS device, or the like that converts an optical image into an electric signal. An A/D converter 23 converts an analog signal into a digital signal. The A/D converter 23 is used to convert an analog signal that is output from the image capturing unit 22 into a digital signal. A barrier 82 covers the shooting lens 83 of the image capturing apparatus 102, thereby preventing contamination and breakage of an image capturing system including the shooting lens 83, the shutter 81, and the image capturing unit 22.

An image processing unit 24 performs, with respect to data from the A/D converter 23 or data from a memory control unit 15, predetermined resizing processing, such as pixel interpolation and scaling-down, and color conversion processing. Moreover, in the image processing unit 24, predetermined calculation processing is performed using a captured image data item, and based on the obtained calculation result, a system control unit 50 performs exposure control and distance-measurement control. Thus, AF (autofocus) processing, AE (auto exposure) processing, and EF (pre-flash emission) processing of a TTL (through-the-lens) method are performed. The image processing unit 24 further performs predetermined calculation processing using the captured image data item and also performs AWB (auto white balance) processing of the TTL method based on the obtained calculation result.

Data that is output from the A/D converter 23 is written to a memory 32 via the image processing unit 24 and the memory control unit 15 or directly via the memory control unit 15. The memory 32 stores an image data item that has been obtained by the image capturing unit 22 and converted into digital data by the A/D converter 23 and an image data item that is to be displayed on the display unit 28. The memory 32 has a sufficient storage capacity for storing a predetermined number of still images as well as moving images and sound of a predetermined period of time.

Moreover, the memory 32 doubles as an image-display memory (video memory). A D/A converter 13 converts an image-display data item stored in the memory 32 into an analog signal and supplies the analog signal to the display unit 28. In this manner, an image data item for display that has been written to the memory 32 is displayed by the display unit 28 via the D/A converter 13. The display unit 28 displays an image corresponding to the analog signal from the D/A converter 13 on a display device such as an LCD.

A non-volatile memory 56 is an electrically erasable and recordable memory, and an EEPROM or the like may be used, for example. The non-volatile memory 56 stores constants for the operations of the system control unit 50, programs, and the like.

The system control unit 50 performs overall control of the image capturing apparatus 102. The system control unit 50 realizes various types of processing by executing the programs recorded in the non-volatile memory 56 described above. A RAM is used as a system memory 52. Constants for the operations of the system control unit 50, variables, programs read from the non-volatile memory 56, and the like are loaded into the system memory 52.

A mode changing switch 60, a first shutter switch 62, a second shutter switch 64, and an operation unit 70 are used to input various operating instructions to the system control unit 50. The mode changing switch 60 switches the operating mode of the system control unit 50 to any of a still image recording mode, a moving image recording mode, a playback mode, and the like. The first shutter switch 62 is turned ON in mid-operation of a shutter button 61 provided on the image capturing apparatus 102, that is, by a so-called "half press" (shooting preparation instruction), and generates a first shutter switch signal SW1. Operations such as AF (autofocus) processing, AE (auto exposure) processing, AWB (auto white balance) processing, and EF (pre-flash emission) processing are started by the first shutter switch signal SW1. The second shutter switch 64 is turned ON upon completion of the operation of the shutter button 61, that is, by a so-called "full press" (shooting instruction), and generates a second shutter switch signal SW2. The second shutter switch signal SW2 causes the system control unit 50 to start a series of shooting processing operations from reading a signal from the image capturing unit 22 to writing an image data item to a recording medium 90. Operation members of the operation unit 70 serve as various types of function buttons, with appropriate functions for each occasion being assigned to those operation members by, for example, selectively operating various function icons displayed on the display unit 28. Examples of the function buttons include an end button, a back button, an image forward button, a jump button, a refine button, an attribute change button, and the like. For example, pressing a menu button causes a menu screen where various types of settings can be made to be displayed on the display unit 28. The user can intuitively make various types of settings using the menu screen displayed on the display unit 28 as well as a four-way button and a SET button.

A power switch 72 switches a power supply ON and OFF. A power control unit 80 is constituted by a battery detection circuit, a DC-DC converter, a switching circuit for switching the block to be energized, and the like, and detects whether or not a battery is installed, the type of the battery, and the remaining battery level. Moreover, based on the detection result as well as an instruction from the system control unit 50, the power control unit 80 controls the DC-DC converter and supplies the necessary voltage to various units including the recording medium 90 for a required period of time. A power supply unit 30 is constituted by a primary battery such as an alkaline battery or a lithium battery, a secondary battery such as a NiCd battery, a NiMH battery, or a Li battery, or an AC adapter. An interface 18 serves as an interface with the recording medium 90 such as a memory card or a hard disk. The recording medium 90 is constituted by a semiconductor memory, a magnetic disk, or the like.

Figure 4:
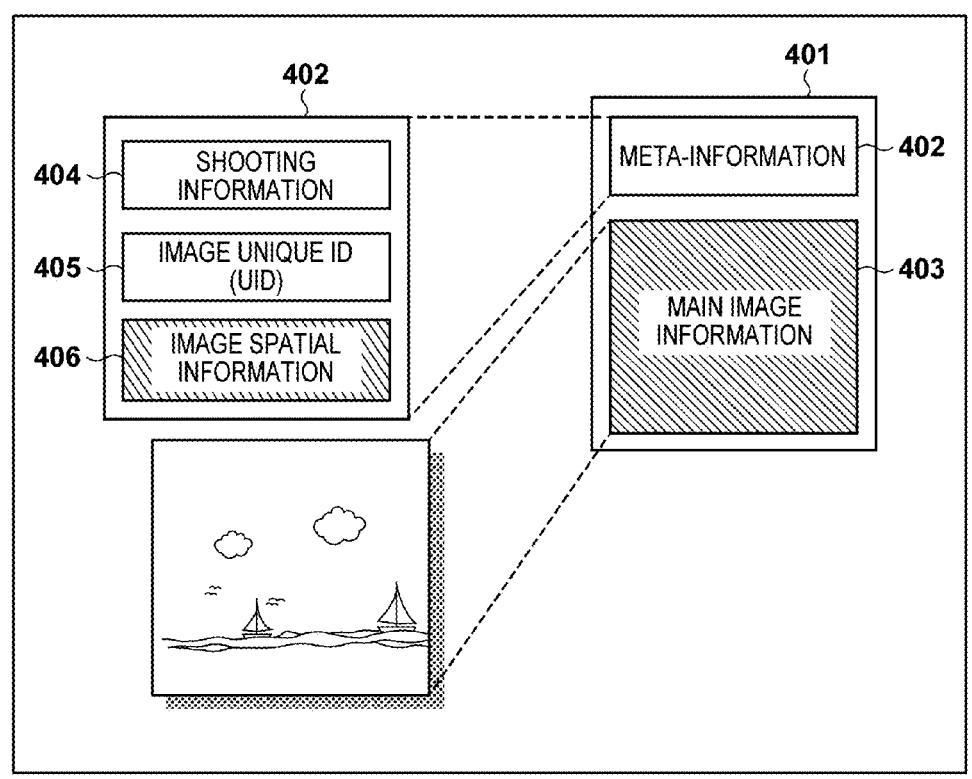
FIG. 4 is a diagram showing a configuration of an image data item 401 generated by the image capturing apparatus 102.

FIG. 4 is a diagram showing a configuration of an image data item 401 generated by the image capturing apparatus 102. In FIG. 4, the image data item 401 contains main image information 403 indicating an image main body and meta-information 402 attached to the main image information 403. The meta-information 402 contains shooting information 404 including the shooting date and time, an image unique ID 405 that is unique to each image, and image spatial information 406 indicating spatial position information with respect to an object contained in an image. Details of the image spatial information 406 will be described later with reference to FIG. 7.

Figure 5:
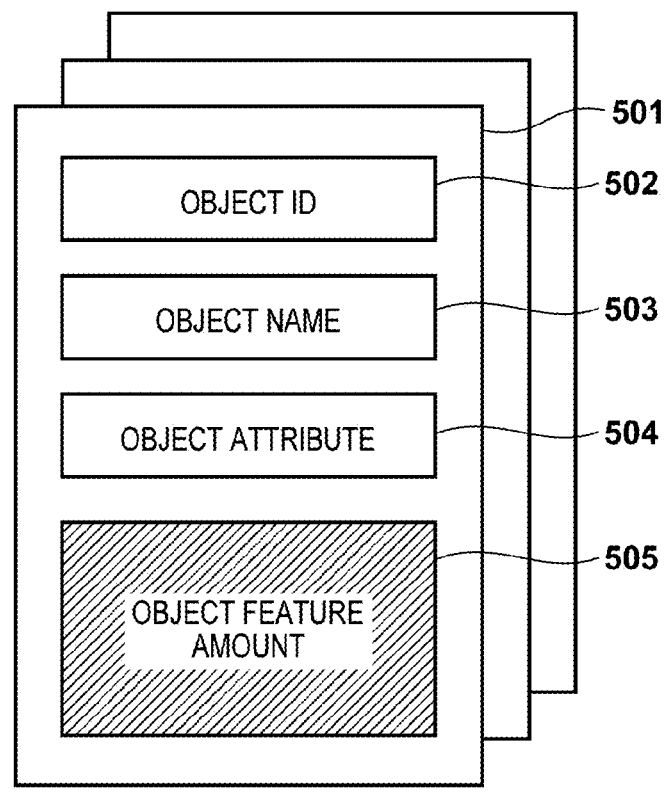
FIG. 5 is a diagram showing a configuration of object unique information 501.

FIG. 5 is a diagram showing a configuration of the object unique information 501. The object unique information 501 is information that is used by the image processing apparatus 101 when performing object recognition processing with respect to an image data item, and individual pieces of object unique information 501 correspond to individual unique objects. The image processing apparatus 101 stores the object unique information 501 in the external storage apparatus 209, for example.

In FIG. 5, an object ID 502 indicates an ID for uniquely identifying an object. An object name 503 indicates the name of an object (e.g., name of a person). An object attribute 504 indicates the class of an object (e.g., general classification name of an object, such as animal, plant, or human). An object feature amount 505 is information indicating the feature of an image of an object, and by performing image processing using this information, the image processing apparatus 101 can uniquely identify an object.

Figure 6:
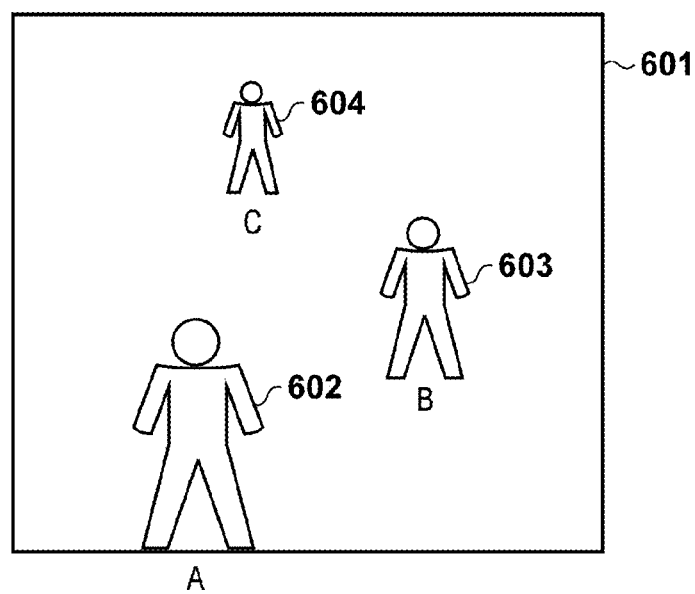
FIG. 6 is a diagram showing an example of a two-dimensional image indicated by main image information 403 in FIG. 4.

FIG. 6 is a diagram showing an example of a two-dimensional image indicated by the main image information 403 in FIG. 4. In FIG. 6, an image 601 contains objects 602, 603, and 604. Based on the image 601, the image processing apparatus 101 can detect the objects and detect the two-dimensional positions (two-dimensional coordinates) of the objects. Note that the main image information 403 does not contain information indicating the position of each object in a depth direction.

Figure 7:
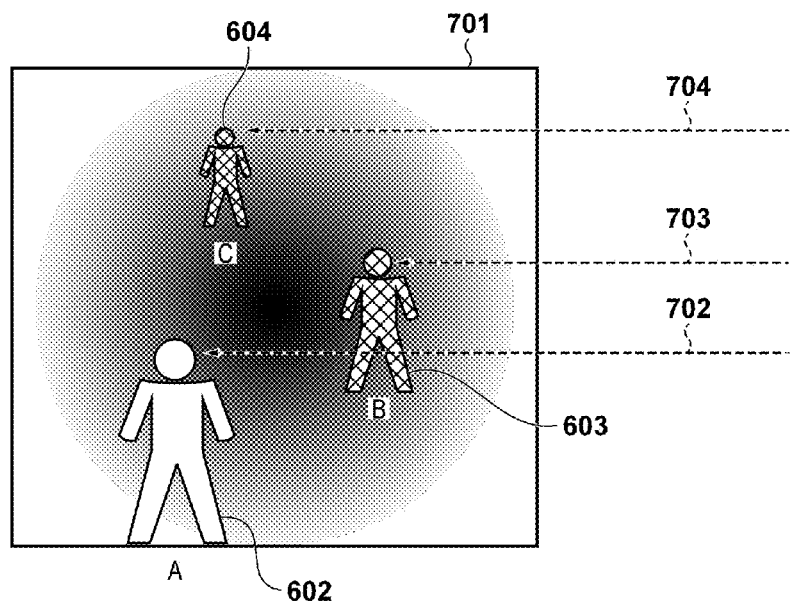
FIG. 7 is a diagram showing a distance map image serving as an example of image spatial information 406 in FIG. 4.

FIG. 7 is a diagram showing a distance map image serving as an example of the image spatial information 406 in FIG. 4. The image capturing apparatus 102 is capable of creating a distance map image based on any appropriate known technology. As an example, a technology disclosed in Japanese Patent Laid-Open No. 2015-73185 can be used. In the present embodiment, a distance map image 701 shows positions (distances) in the depth direction of the image 601 using shading of the image. In the distance map image 701, a bright portion is on the front side, and a dark portion is on the back side. Based on the distance map image 701, the image processing apparatus 101 can detect positions 702, 703, and 704 of the respective objects 602, 603, and 604 in the depth direction.

Note that although it is assumed that the image spatial information 406 is a distance map image in the following description, the image spatial information 406 may be any type of information as long as the image processing apparatus 101 can detect the position of each object in the depth direction. For example, the image capturing apparatus 102 may also detect the three-dimensional position (three-dimensional coordinates) including the position in the depth direction, of an object when capturing an image and record the three-dimensional coordinates of each object as the image spatial information 406.

Here, referring to FIG. 12, indexing processing executed by the image processing apparatus 101 will be described. Unless otherwise stated, processing in each step of this flowchart is realized by the CPU 206 of the image processing apparatus 101 executing a program stored in the external storage apparatus 209. If the image processing apparatus 101 acquires at least one image data item, processing of this flowchart is started. The image data acquisition processing may be performed by, for example, the image processing apparatus 101 receiving at least one image data item from the image capturing apparatus 102.

Figure 8:
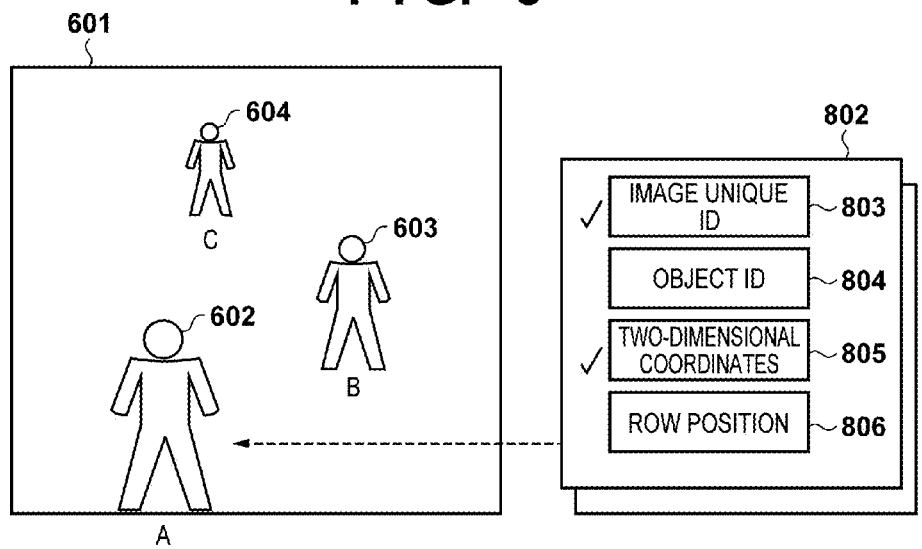
FIG. 8 is a diagram showing a configuration of object management information 802.

In step S1201, the image processing apparatus 101 detects an object in an image based on the main image information 403 (FIG. 4) of the image data item 401 and records the two-dimensional coordinates of the detected object in object management information 802 shown in FIG. 8. The image processing apparatus 101 can detect the two-dimensional coordinates of an object using any appropriate known technology.

The object management information 802 is information for managing each object contained in each image data item, and individual pieces of object management information 802 correspond to individual objects contained in individual image data items. Even the same object is managed by different pieces of object management information 802 if the object is contained in different image data items. In the example shown in FIG. 8, based on the image 601, three pieces of object management information 802 corresponding to the respective objects 602, 603, and 604 are generated.

As shown in FIG. 8, the object management information 802 contains an image unique ID 803, an object ID 804, two-dimensional coordinates 805, and a row position 806. In the image unique ID 803, the same information as that of the image unique ID 405 (FIG. 4) of the image data item 401 is recorded. That is to say, the image processing apparatus 101 acquires the image unique ID 405 from the image data item 401 that is currently being processed, and records the acquired image unique ID 405 in the image unique ID 803 of the object management information 802. The object ID 804 indicates an ID for uniquely identifying an object. In step S1201, even though the presence of an object is detected, the object ID 804 is empty because recognition processing has not yet been performed. The two-dimensional coordinates 805 indicate the two-dimensional coordinates of a detected object. The row position 806 indicates the position of an object in the depth direction in units of rows. In step S1201, the row position 806 is empty because detection of the position of the object in the depth direction has not yet been performed.

Figure 9:
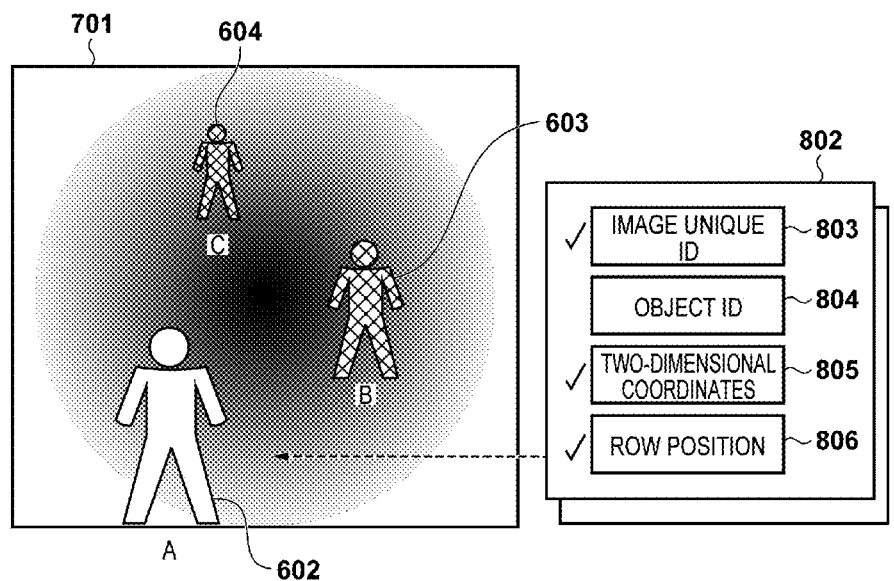
FIG. 9 is a conceptual diagram of processing for recording a row position 806.

Next, in step S1203, the image processing apparatus 101 performs position acquisition processing. Specifically, the image processing apparatus 101 acquires the position (depth) in the depth direction, of a portion corresponding to the two-dimensional coordinates of each object from the distance map image 701, and stores the acquired position in the row position 806 of the object management information 802 (see FIG. 9). In step S1205, the image processing apparatus 101 converts the depth information recorded in the row position 806 into row information and stores the row information in the row position 806 again.

A "row" as used in the present embodiment associates a predetermined position range (depth range) with a single position (i.e., a single row). In the present embodiment, it is assumed that the conversion from depth information into row information is performed by determining an upper limit of the number of rows in an image and judging the length of the distance between objects. The image processing apparatus 101 first measures the distances between objects and lists the measured distances in descending order. A space from the location of an object of the top-listed measured distance to the location of the upper limit number row is regarded as a row separation reference space, and if a measured distance is equal to or greater than this space, the two corresponding objects are considered to be located on separate rows and separated from each other, while if a measured distance is smaller than the row separation reference space, the two corresponding objects are considered to be located on the same row and are grouped together.

Alternatively, the image processing apparatus 101 may also divide a possible range of the value of the depth information into a plurality of segments and perform the conversion from the depth information into the row information based on which segment the depth information that is to be converted belongs to.

In step S1206, the image processing apparatus 101 judges whether or not processing with respect to all of the image data items is complete. If any unprocessed image data item remains, the image processing apparatus 101 advances the processing to step S1213, changes the processing target to the next image data item, and executes the processing in steps S1201 to S1205. If processing with respect to all of the image data items is complete, the image processing apparatus 101 advances the processing to step S1207.

In step S1207, the image processing apparatus 101 stores the greatest number of rows of the pieces of object management information 802 (the greatest value of the row positions 806 of the respective pieces of object management information 802 generated by the processing in steps S1201 to S1205) for a variable Rmax. Here, the variable Rmax indicates the number of rows to be subjected to object recognition processing (how many rows starting from the first row on the front side to the back side are to be used as the rows on which objects are subjected to recognition processing).

Note that instead of the greatest number of rows of the pieces of object management information 802, a preset number of rows may also be used as Rmax. In this case, an object that is located rearward (backward) of the preset number row is excluded from the target of recognition processing.

Figure 10:
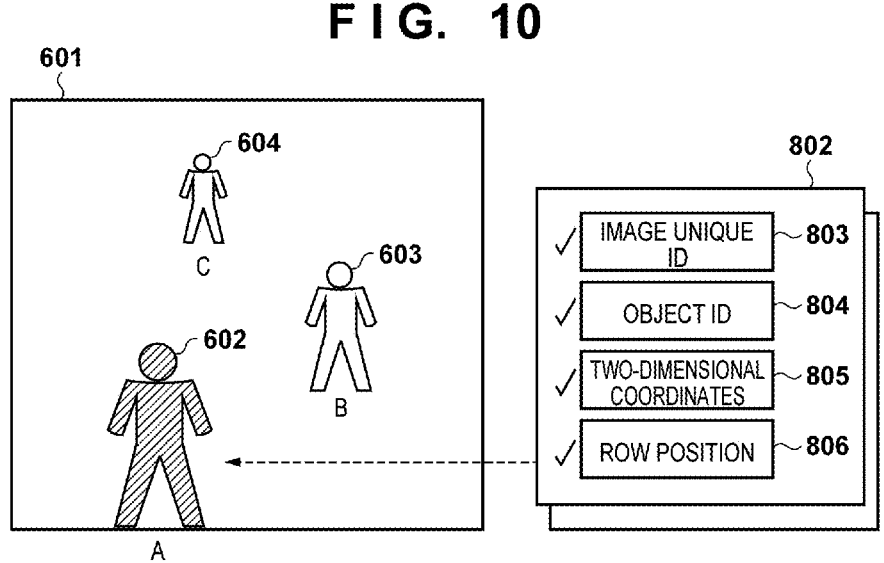
FIG. 10 is a conceptual diagram of object recognition processing.

In step S1208, the image processing apparatus 101 assigns 1 to a row variable R, thereby initializing the row variable R. In step S1209, the image processing apparatus 101 performs recognition processing with respect to an object on the R-$^{th}$ row and records the recognition result in the object ID 804 (see FIG. 10). Specifically, the image processing apparatus 101 detects an object feature amount of the object 602 in the image 601 and compares the detected object feature amount with object feature amounts 505 of a plurality of respective pieces of object unique information 501 (FIG. 5) stored in the external storage apparatus 209. If a piece of object unique information 501 to which the degree of coincidence of the object feature amounts is equal to or greater than a threshold value is detected, the image processing apparatus 101 records the value of the object ID 502 of this piece of object unique information 501 in the object ID 804 of the object management information 802. Therefore, the object unique information 501 serves as an object candidate, which may possibly correspond to an unknown object, in the object recognition processing. If a plurality of pieces of object unique information 501 to which the degree of coincidence of the object feature amounts is equal to or greater than the threshold value are detected, the image processing apparatus 101 uses the piece of object unique information 501 with the greatest degree of coincidence. As a result of this object recognition processing, all the information items required for the object management information 802 are stored, and the object management information 802 can be used as a search key for image search. The object management information 802 contains the image unique ID 803 and the object ID 804 and thus serves to associate a specific object with an image data item containing this object.

In step S1210, the image processing apparatus 101 judges whether or not recognition processing of the R-$^{th}$ row with respect to all of the image data items is complete. If any unprocessed image data item remains, the image processing apparatus 101 advances the processing to step S1214, changes the processing target to the next image data item, and executes the processing in step S1209. If processing with respect to all of the image data items is complete, the image processing apparatus 101 advances the processing to step S1211.

In step S1211, the image processing apparatus 101 adds 1 to the row variable R. In step S1212, the image processing apparatus 101 judges whether or not R≤Rmax. If R≤Rmax, the image processing apparatus 101 returns the processing to step S1209, and performs recognition processing of an object on the next row with respect to all of the image data items in the same manner. If the recognition processing with respect to all of the rows is complete (i.e., if R>Rmax in step S1212), processing of this flowchart is ended.

Figure 12:
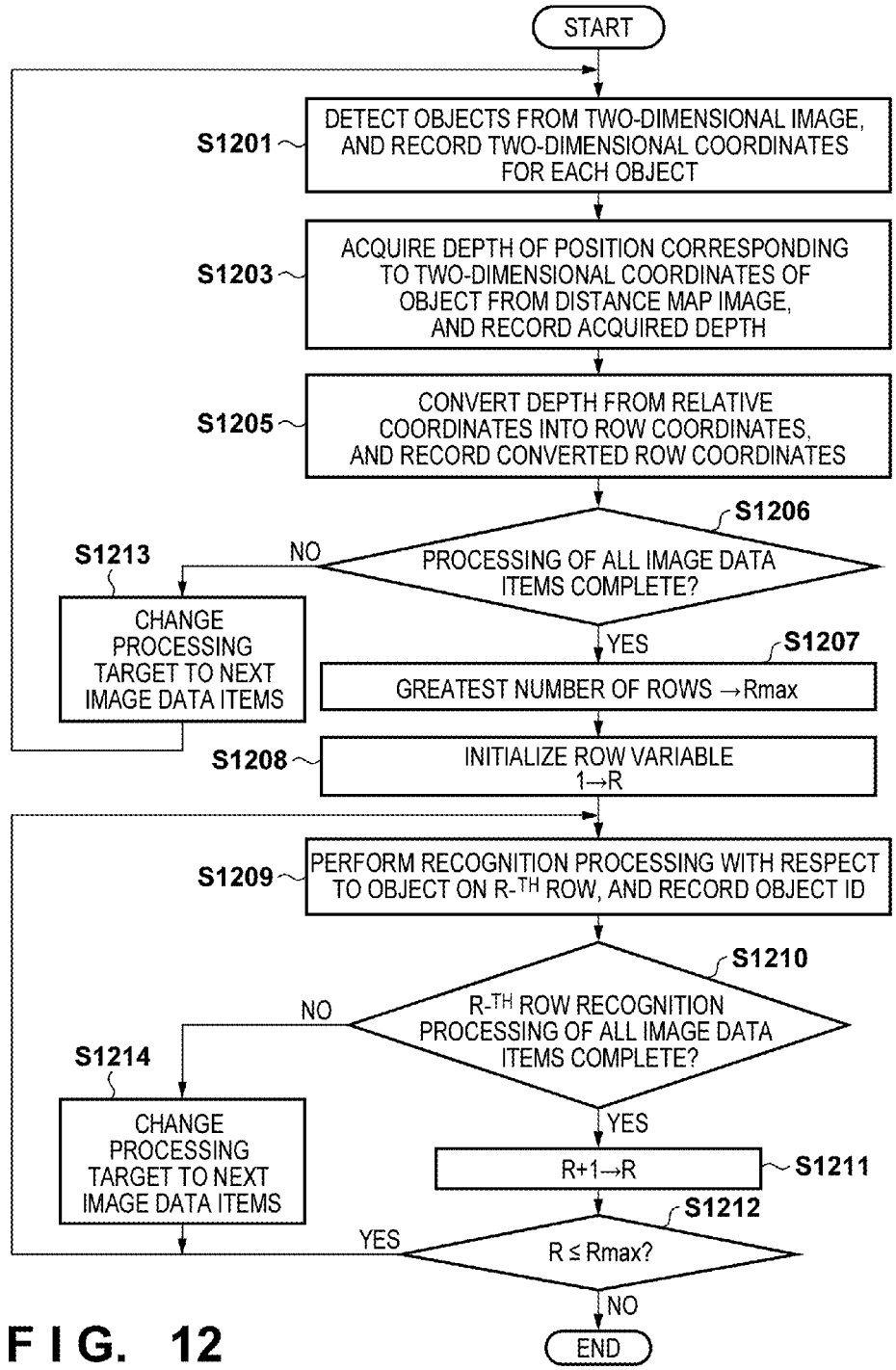
FIG. 12 is a flowchart of indexing processing executed by the image processing apparatus 101.

As can be understood from FIG. 12, in the indexing processing of the present embodiment, the image processing apparatus 101 performs recognition processing in such a manner that the closer to the front an object is located, the more preferentially the recognition processing of that object is performed. The reason for this is that if an image data item contains a plurality of objects, it can be considered that the closer to the front an object is located, the higher the importance of that object to the user. Object recognition processing is processing that has a relatively high computational load and that takes time; however, according to the present embodiment, the higher the importance to the user an object is considered to have, the sooner the recognition processing of that object is completed. Thus, it can be expected that even when the indexing processing is in progress, search of an image data item containing an object that is considered to be of a high importance to the user becomes possible at a relatively early stage.

Figure 13:
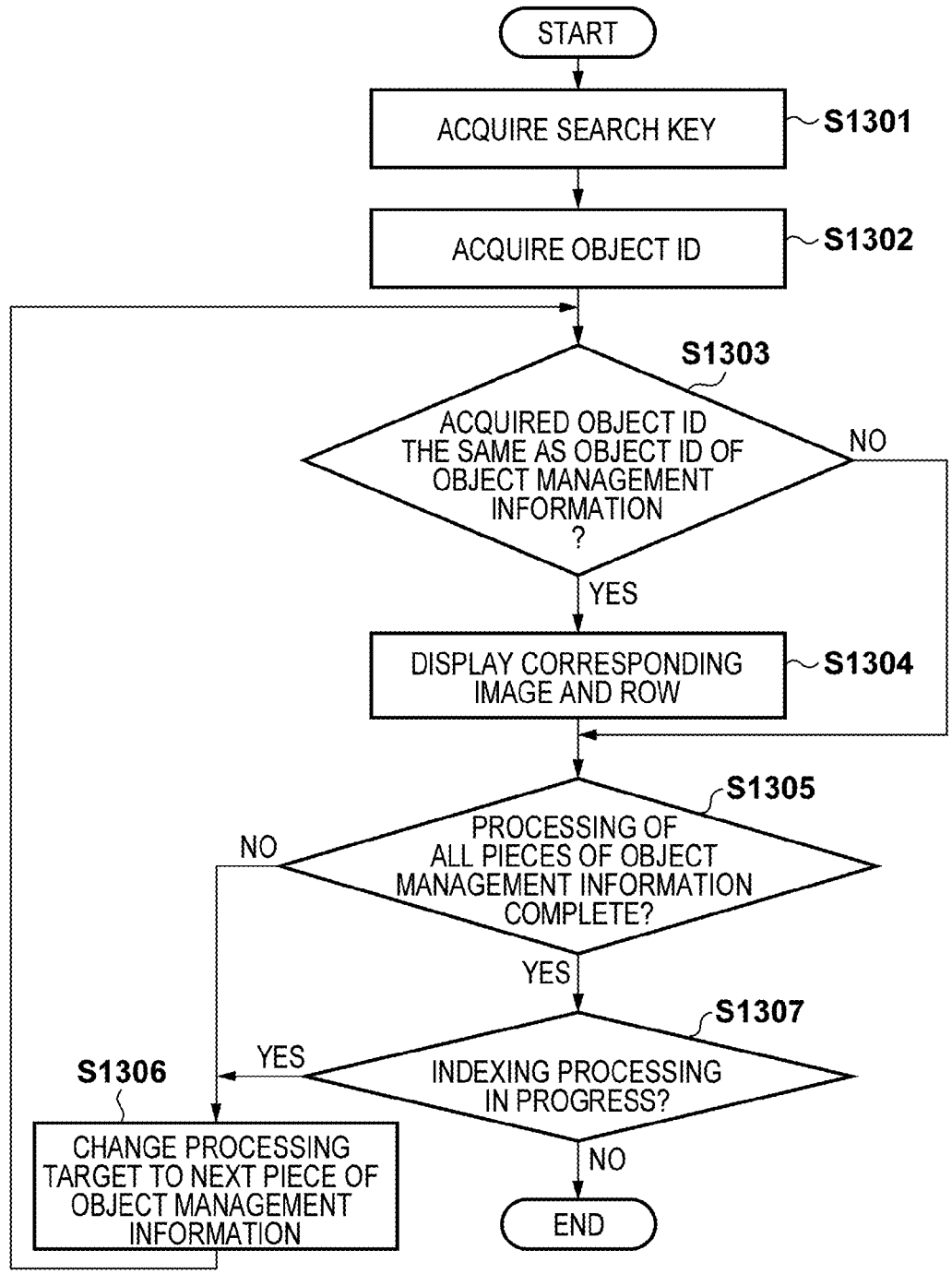
FIG. 13 is a flowchart of image search processing executed by the image processing apparatus 101 according to a first embodiment.

Next, referring to FIG. 13, image search processing executed by the image processing apparatus 101 will be described. Unless otherwise stated, processing in each step of this flowchart is realized by the CPU 206 of the image processing apparatus 101 executing a program stored in the external storage apparatus 209. If the user inputs an instruction to the image processing apparatus 101 to shift to the image search mode, processing of this flowchart is started. Note that even if the indexing processing in FIG. 12 is not yet complete, the image processing apparatus 101 is capable of executing the image search processing in FIG. 13 concurrently with the indexing processing.

In step S1301, the image processing apparatus 101 displays a search screen (see FIG. 11) on the monitor 201 and acquires a search key that is input to a search box 1101 by the user. The search key may be any information provided that it is information by which a search target object (an object to be searched for) can be specified. For example, the search key may be the name of a person. The input of the search key serves as a search instruction given to the image processing apparatus 101. If a search key is input (i.e., if a search instruction is received), the image processing apparatus 101 starts search of an image data item regardless of whether or not the indexing processing is complete. If the indexing processing is not yet complete at the start of the search, the search is performed concurrently with the indexing processing.

In step S1302, the image processing apparatus 101 acquires an object ID corresponding to the search key. Specifically, the image processing apparatus 101 detects, from among the pieces of object unique information 501 stored in the external storage apparatus 209, a piece of object unique information 501 having an object name 503 that matches the search key, and acquires the object ID 502 of the detected piece of object unique information 501.

In step S1303, the image processing apparatus 101 judges whether or not the object ID acquired in step S1302 coincides with the object ID 804 of the object management information 802 that is currently being processed. If the object IDs coincide, the image processing apparatus 101 advances the processing to step S1304, and if the object IDs are different, the image processing apparatus 101 advances the processing to step S1305.

Figure 11:
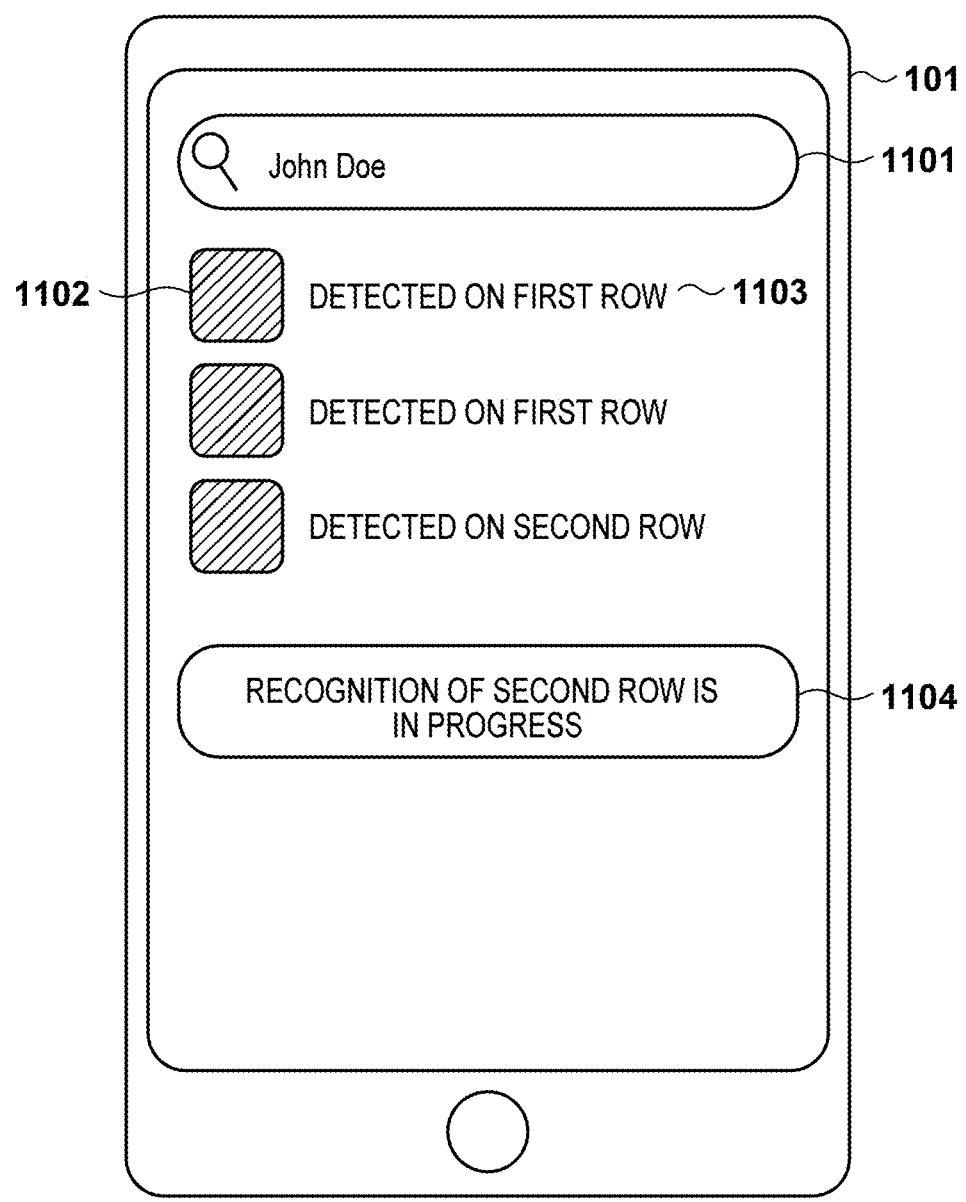
FIG. 11 is a diagram showing an example of a search screen.

In step S1304, the image processing apparatus 101 displays information indicating an image data item corresponding to the image unique ID 803 of the object management information 802 that is currently being processed (i.e., image data item found by search) on the monitor 201 as the search result. In the present embodiment, it is assumed that the image processing apparatus 101 displays thumbnail images and rows on the monitor 201 based on the image unique ID 803 and the row position 806 of the object management information 802 that is currently being processed. For example, as shown in FIG. 11, the image processing apparatus 101 displays thumbnail images 1102 and row information 1103. This enables the user to realize that the search target object is contained on the rows indicated by the row information 1103 in the image data items indicated by the thumbnail images 1102. If the indexing processing is being executed, display of the search result is performed concurrently with the indexing processing.

In step S1305, the image processing apparatus 101 judges whether or not processing with respect to all of the pieces of object management information 802 is complete. If any unprocessed piece of object management information 802 remains, the image processing apparatus 101 advances the processing to step S1306, changes the processing target to the next piece of object management information 802, and executes the processing in step S1303. By repetition of this procedure, all of the pieces of object management information 802 that contain the object ID corresponding to the search key are detected, and corresponding thumbnail images and rows are displayed on the monitor 201. If processing with respect to all of the pieces of object management information 802 is complete, the image processing apparatus 101 advances the processing to step S1307.

In step S1307, the image processing apparatus 101 judges whether or not the indexing processing in FIG. 12 is being executed. If the indexing processing is in execution, there is a possibility that even if processing with respect to all of the existing pieces of object management information 802 is complete, a new piece of object management information 802 may be generated. Thus, the image processing apparatus 101 returns the processing to step S1306 and performs search processing also with respect to the newly generated piece of object management information 802 in the same manner.

Note that if the indexing processing is being executed, the image processing apparatus 101 may display recognized row information 1104 (FIG. 11) on the monitor 201. The row number that is displayed here corresponds to the value of the row variable R that has been described above with reference to FIG. 12. This enables the user to know which number row the object that is currently being subjected to recognition processing of indexing processing is located on. Moreover, the user can realize that, with respect to those rows that are located forward of the row indicated by the recognized row information 1104, recognition processing is complete, and an image data item containing an object corresponding to the search key is detectable.

If it is judged in step S1305 that processing with respect to all of the pieces of object management information 802 is complete, and it is judged in step S1307 that indexing processing is not being executed, processing of this flowchart is complete.

As described above, according to the first embodiment, during indexing processing, the image processing apparatus 101 performs recognition processing such that the closer to the front an object is located, the more preferentially the recognition processing of that object is performed. Thus, recognition processing of an object that is considered to be of high importance to the user is completed at a relatively early stage, and an image data item containing such an object can be effectively searched for.

Note that as long as a plurality of objects are present in total, the effects of the present embodiment are achieved regardless of whether the target of indexing processing is a single image data item or a plurality of image data items. For example, if the target of indexing processing is a single image data item containing a plurality of objects, recognition processing is performed such that the closer to the front an object is located, the more preferentially the recognition processing of that object is performed. Therefore, if the search target object is located forward of the other objects in this image data item, the user can realize this fact at a relatively early stage.

Moreover, in the present embodiment, indexing processing is not necessarily performed. For example, the image processing apparatus may start object recognition processing in response to acquisition of a search key and searches for an image data item containing the search target object.

Second Embodiment

In a second embodiment, a configuration in which the user is able to designate a search target row range during image search processing will be described. In the present embodiment, the basic configuration of the image processing system 100 is the same as that of the first embodiment. Hereinafter, the differences from the first embodiment will be mainly described.

Figure 14:
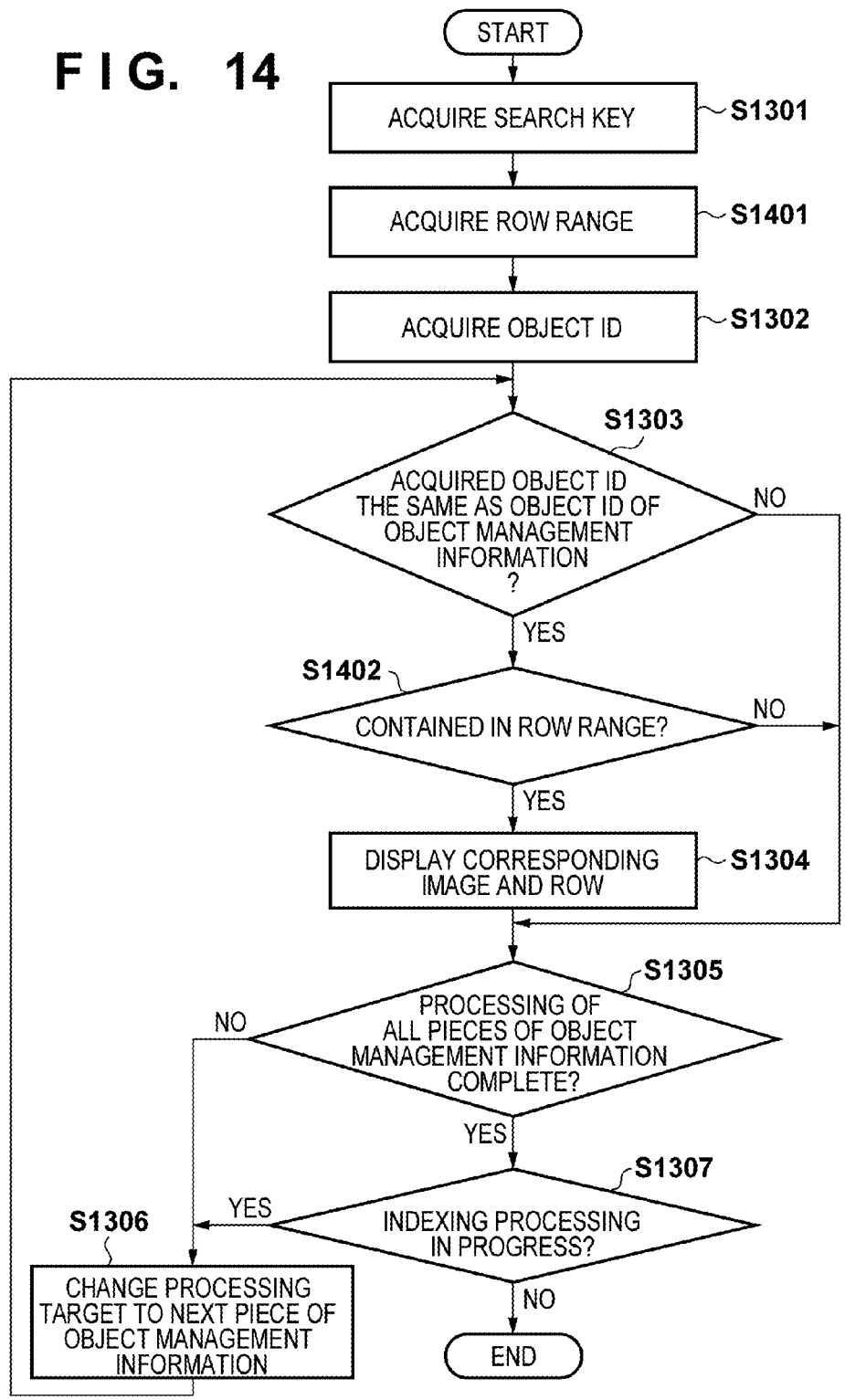
FIG. 14 is a flowchart of image search processing executed by the image processing apparatus 101 according to a second embodiment.

FIG. 14 is a flowchart of image search processing executed by the image processing apparatus 101 according to the second embodiment. Unless otherwise stated, processing in each step of this flowchart is realized by the CPU 206 of the image processing apparatus 101 executing a program stored in the external storage apparatus 209. In this flowchart, those steps in which processing that is the same as or similar to the processing in FIG. 13 is performed are denoted by the same reference numerals as those in FIG. 13. If the user inputs an instruction to the image processing apparatus 101 to shift to the image search mode, processing of this flowchart is started. Note that even when the indexing processing in FIG. 12 is not yet complete, the image processing apparatus 101 is capable of executing image search processing in FIG. 14 concurrently with the indexing processing.

In step S1401, the image processing apparatus 101 acquires a row range that is input by the user. That is to say, in the present embodiment, the search instruction includes the row range (search range) in addition to the search key. In order to enable the user to input the row range, the image processing apparatus 101 displays a row range input box (not shown) under the search box 1101 shown in FIG. 11, for example. The row range may be a continuous range such as "1 to 3" or may be a discontinuous range such as "3, 5", for example.

In step S1402, the image processing apparatus 101 judges whether or not the row position 806 of the object management information 802 that is currently being processed is contained in the row range acquired in step S1401. If the row position 806 is contained in the row range, the image processing apparatus 101 advances the processing to step S1304, and if not, the image processing apparatus 101 advances the processing to step S1305.

With the foregoing processing, the search target row of image search processing can be limited to within the search range designated by the user.

Third Embodiment

In a third embodiment, a configuration will be described in which, if image search processing is performed after completion of indexing processing, the closer to the front the search target object is located in an image data item, the higher the rank at which that image data item is displayed in the search result. In the present embodiment, the basic configuration of the image processing system 100 is the same as that of the first embodiment. Hereinafter, the differences from the first embodiment will be mainly described.

Figure 15:
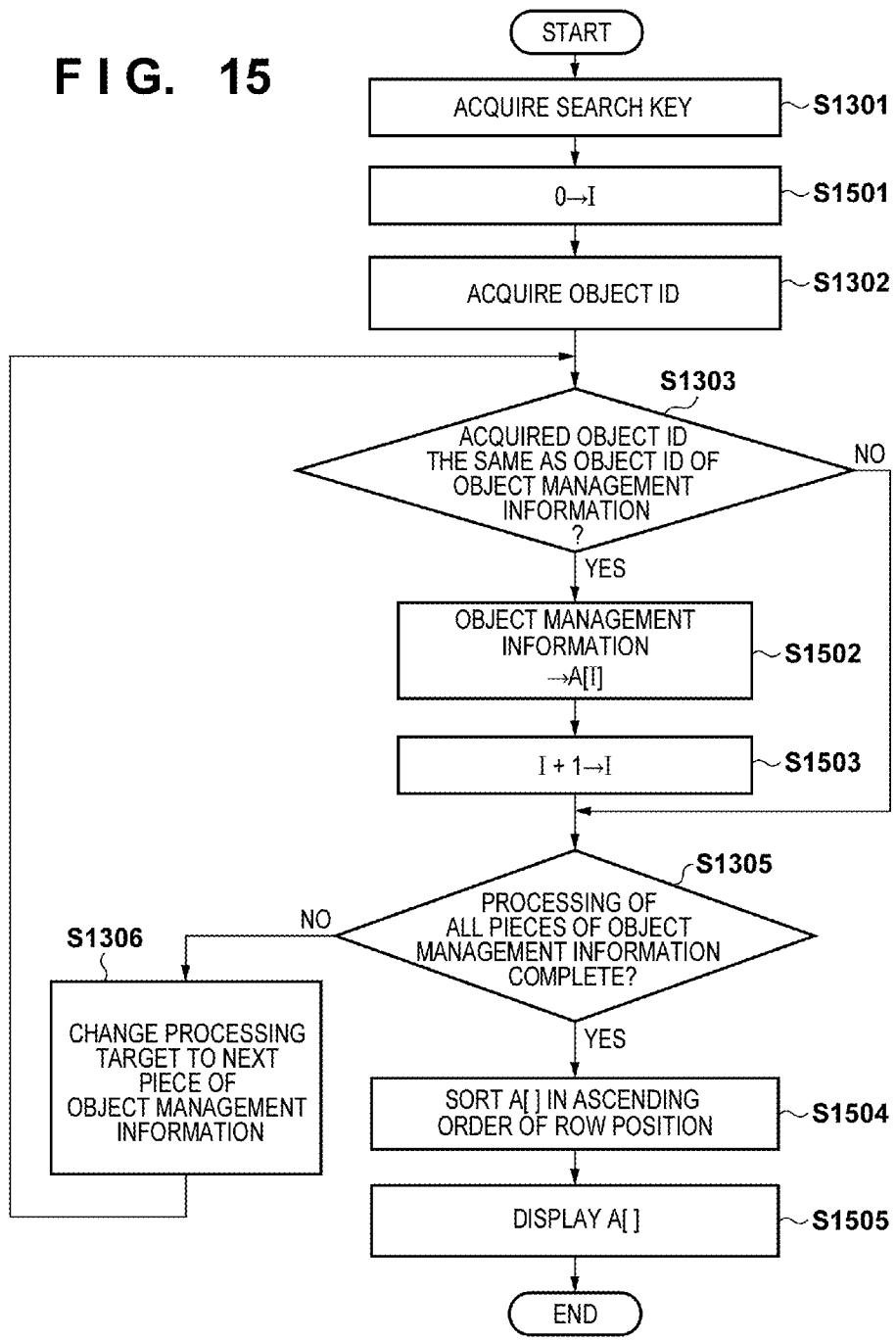
FIG. 15 is a flowchart of image search processing executed by the image processing apparatus 101 according to a third embodiment.

FIG. 15 is a flowchart of image search processing executed by the image processing apparatus 101 according to the third embodiment. Unless otherwise stated, processing in each step of this flowchart is realized by the CPU 206 of the image processing apparatus 101 executing a program stored in the external storage apparatus 209. In this flowchart, those steps in which processing that is the same as or similar to the processing in FIG. 13 are denoted by the same reference numerals as those in FIG. 13. If the user inputs an instruction to the image processing apparatus 101 to shift to the image search mode, processing of this flowchart is started.

In step S1501, the image processing apparatus 101 initializes a variable I to 0. In step S1502, the image processing apparatus 101 stores the object management information 802 that is currently being processed at the I-$^{th}$ position of an array variable A. In step S1503, the image processing apparatus 101 adds 1 to the variable I.

After processing with respect to all of the pieces of object management information 802 is complete, in step S1504, the image processing apparatus 101 sorts the array variable A in ascending order of row positions using the row position 806 as a sort key. In step S1505, the image processing apparatus 101 displays images and rows corresponding to the respective pieces of object management information 802 stored at the array variable A, on the monitor 201 in ascending order of array indices.

With the foregoing processing, the closer to the front the search target object is located in an image data item, the higher the rank at which that image data item is displayed in the search result. That is to say, individual items of the search result are displayed lined up in the order from the front side toward the back side with respect to the row on which the search target object is located.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163090, filed Aug. 20, 2015, which is hereby incorporated by reference herein in its entirety.

What is claimed is:

1. An image processing apparatus comprising:
an image data acquisition unit configured to acquire a plurality of image data items each containing one or more objects;
a position acquisition unit configured to acquire respective positions, in a depth direction, of a plurality of objects contained in the plurality of image data items; and
an object recognition unit configured to perform, with respect to each of the plurality of objects, object recognition processing of detecting a corresponding object candidate from among a plurality of object candidates,
wherein the object recognition unit performs the object recognition processing, based on the respective positions of the plurality of objects in the depth direction, in such a manner that the closer to a front side an object is located, the more preferentially the object recognition processing of that object is performed.

2. The image processing apparatus according to claim 1, further comprising:
a reception unit configured to receive a search instruction regarding, as a search target, an object corresponding to one of the plurality of object candidates; and
a search unit configured to search for, from the plurality of image data items, an image data item containing the search target object, based on a result of the object recognition processing with respect to each of the plurality of objects,
wherein the search unit starts the search in response to the search instruction regardless of whether or not the object recognition processing with respect to all of the plurality of objects is complete, and if an object with respect to which the object recognition processing is not yet complete is present, the search is performed concurrently with the object recognition processing.

3. The image processing apparatus according to claim 2, further comprising:
a display unit configured to display, as a search result, information indicating an image data item found by the search unit,
wherein, when the search unit is performing the search concurrently with the object recognition processing, the display unit performs the display concurrently with the object recognition processing.

4. The image processing apparatus according to claim 3, wherein, if the object recognition processing with respect to all of the plurality of objects is complete at the start of the search, the display unit displays the search result in such a manner that search result is arranged in an order from a front side to a back side with respect to the position of the search target object in the depth direction.

5. The image processing apparatus according to claim 2, wherein the object recognition unit generates object management information that associates the object candidate detected by the object recognition processing with an image data item containing an object corresponding to the object candidate.

6. The image processing apparatus according to claim 5, wherein the search unit performs the search based on the object management information.

7. The image processing apparatus according to claim 2, wherein the search instruction includes a search range with respect to a position in the depth direction, and the search unit searches for an image data item containing the search target object at a position in the depth direction, the position being within the search range.

8. The image processing apparatus according to claim 1, wherein the position acquisition unit acquires the respective positions of the plurality of objects in the depth direction in units of rows each associating a predetermined position range with a single position.

9. An image processing apparatus comprising:
an image data acquisition unit configured to acquire an image data item containing a plurality of objects;
a position acquisition unit configured to acquire respective positions, in a depth direction, of the plurality of objects; and
an object recognition unit configured to perform, with respect to each of the plurality of objects, object recognition processing of detecting a corresponding object candidate from among a plurality of object candidates,
wherein the object recognition unit performs the object recognition processing, based on the respective positions of the plurality of objects in the depth direction, in such a manner that the closer to a front side an object is located, the more preferentially the object recognition processing of that object is performed.

10. An image processing method by an image processing apparatus, comprising:
acquiring a plurality of image data items each containing one or more objects;
acquiring respective positions, in a depth direction, of a plurality of objects contained in the plurality of image data items; and
performing, with respect to each of the plurality of objects, object recognition processing of detecting a corresponding object candidate from among a plurality of object candidates,
wherein the performing performs the object recognition processing, based on the respective positions of the plurality of objects in the depth direction, in such a manner that the closer to a front side an object is located, the more preferentially the object recognition processing of that object is performed.

11. An image processing method by an image processing apparatus, comprising:
acquiring an image data item containing a plurality of objects;
acquiring respective positions, in a depth direction, of the plurality of objects; and
performing, with respect to each of the plurality of objects, object recognition processing of detecting a corresponding object candidate from among a plurality of object candidates,
wherein the performing performs the object recognition processing, based on the respective positions of the plurality of objects in the depth direction, in such a manner that the closer to a front side an object is located, the more preferentially the object recognition processing of that object is performed.

12. A non-transitory computer-readable storage medium which stores a program for causing a computer to execute an image processing method comprising:
acquiring a plurality of image data items each containing one or more objects;
acquiring respective positions, in a depth direction, of a plurality of objects contained in the plurality of image data items; and
performing, with respect to each of the plurality of objects, object recognition processing of detecting a corresponding object candidate from among a plurality of object candidates,
wherein the performing performs the object recognition processing, based on the respective positions of the plurality of objects in the depth direction, in such a manner that the closer to a front side an object is located, the more preferentially the object recognition processing of that object is performed.

13. A non-transitory computer-readable storage medium which stores a program for causing a computer to execute an image processing method comprising:
acquiring an image data item containing a plurality of objects;
acquiring respective positions, in a depth direction, of the plurality of objects; and
performing, with respect to each of the plurality of objects, object recognition processing of detecting a corresponding object candidate from among a plurality of object candidates,
wherein the performing performs the object recognition processing, based on the respective positions of the plurality of objects in the depth direction, in such a manner that the closer to a front side an object is located, the more preferentially the object recognition processing of that object is performed.

* * * * *